J. J. Ross,

Fishing Reel.

No. 95,839.                                  Patented Oct. 12, 1869.

Witnesses:
H. W'm Dopp.
Mich. J. Stark

James J. Ross

United States Patent Office.

JAMES J. ROSS, OF BUFFALO, NEW YORK, ASSIGNOR TO SARAH ROSS OF SAME PLACE.

Letters Patent No. 95,839, dated October 12, 1869.

IMPROVEMENT IN FISHING-REELS.

The Schedule referred to in these Letters Patent and making part of the same.

I, JAMES J. ROSS, of Buffalo, in the county of Erie, and the State of New York, have invented certain improvements in Fishing-Reels, of which the following is a specification.

The nature of my invention consists in constructing a fishing-reel, in such a manner that the fish-line may be wound up and unwound with facility, and that a current of air may pass through the centre of the reel, for the purpose of drying the fish-line upon the reel, whenever wound upon the same.

I refer to the drawing, which is a part of this specification.

Letter A is the main frame of the reel. It is so constructed that the reel can revolve within the frame, by having one of the bearings of the reel in the centre, and engaging the same in a recess in the frame, and another, the opposite one, on the periphery of the reel, revolving within the frame, as clearly illustrated by the drawings, thus leaving this end of the reel free, to enable the use of a hollow barrel or reel, in order to facilitate the drying of the fish-line.

B is the barrel or reel. It is constructed of two disks, having a hole in their centre. They are connected together by means of a series of rods, C, which constitute a pulley.

The object to construct the barrel or reel in this manner is to secure a reel of considerable diameter with but little weight, and to provide for drying the fish-line when wet.

Figure 1:
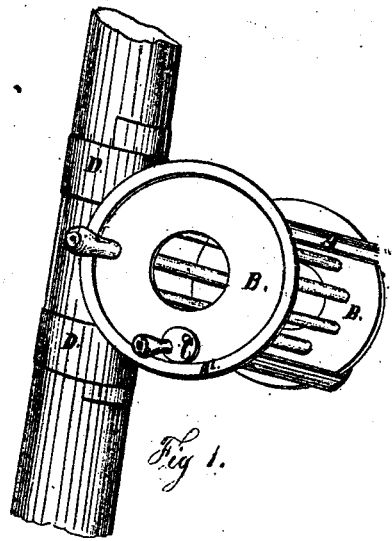
Figure 1 represents the fishing-reel, in a perspective view, secured to a fish-pole by means of two bands D D.
Figure 2:
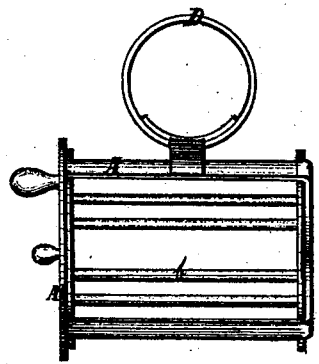
Figure 2 shows the reel in a plan view.

The said disks are provided, one with a pivot in its centre, to answer as bearing, the other with a little handle, by means of which the reel is turned; also with a little eccentric, O, which has for its object to stop the reel from turning, whenever it is desired, by impinging upon the frame-ring A', as plainly seen in fig. 1.

It will be observed, that when the eccentric, O, is brought in contact with A', it will prevent the reel from working only in one direction, while in the other it may be worked at any time; also that the eccentric, O, might be set so that the reel can be worked in any direction.

Having thus fully described my invention,

What I desire to secure by Letters Patent, is—

The arrangement and construction of the barrel or reel B, as described, and for the use and purpose set forth.

Also, the combination of A', barrel or reel B, and eccentric, O, to operate substantially as and for the purpose set forth.

JAMES J. ROSS.

Witnesses:
H. WM. DOPP,
MICH. J. STARK.